Dec. 14, 1965 R. N. BRANDON 3,223,342
TAPE REEL
Filed July 17, 1963 2 Sheets-Sheet 1

Dec. 14, 1965 R. N. BRANDON 3,223,342

TAPE REEL

Filed July 17, 1963 2 Sheets-Sheet 2

3,223,342
TAPE REEL
Richard N. Brandon, Richmond, Va., assignor of one-tenth to Auzville Jackson, Jr., Richmond, Va.
Filed July 17, 1963, Ser. No. 295,749
2 Claims. (Cl. 242—74.2)

This invention relates to a tape reel and particularly to means associated with the hub thereof adapted to clamp an end portion of a tape inserted therebetween to retain it previous to the initial winding of the tape thereon.

It is an object of the invention to provide a clamping means associated with the hub of the reel which is simple and effective, and which may be constructed at a very low cost.

For the purpose of aiding in the explanation of the invention, I show in the accompanying drawings and hereinafter describe one practical embodiment of it. It is to be understood, however, that this embodiment is presented merely by way of illustration and that specific showing and description of it are not to be construed in any fashion as limiting the appended claims short of the true and comprehensive scope of the invention.

Details of construction and arrangement of parts will be apparent as the description proceeds, reference now being had to the figures of the accompanying drawings forming a part of this application, and wherein like reference numerals indicate like parts.

It is to be understood that throughout this application the term "tape" is used in the broad sense as encompassing such terms as "film," "ribbon," and the like.

Figure 1:
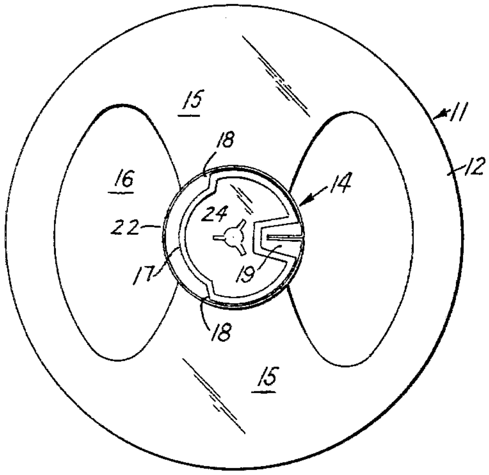
FIGURE 1 is a plan of a reel showing the clamp associated with the hub, the top flange being omitted for clarity.
Figure 2:
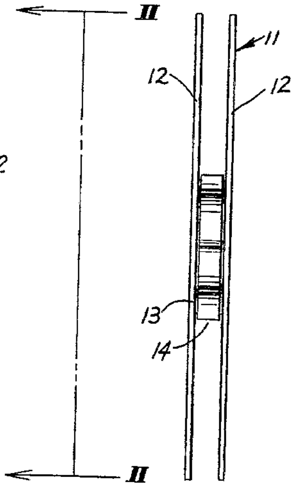
FIGURE 2 is a side view of the reel taken on II—II of FIGURE 1 and including the top flange.
Figure 3:
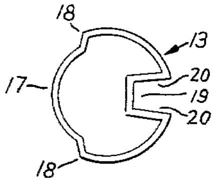
FIGURE 3 is a plan view of the hub.
Figure 4:
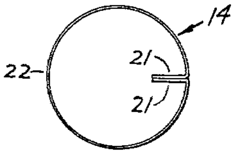
FIGURE 4 is a plan view of the clamp.

With reference to FIGURES 1 and 2, the reel 11 has two flanges 12 separated by a hub 13. Surrounding the hub is a clamp 14. Each of the two flanges 12 has two spokes 15 and an open space 16 to provide access to the clamp so that inward radial pressure can be applied at the deformation area 22. Each of the flanges has a center hole 24 for mounting on a spindle of the apparatus accepting the reel, such as a tape recorder, typewriter, projector, or the like.

Figures 5, 6:
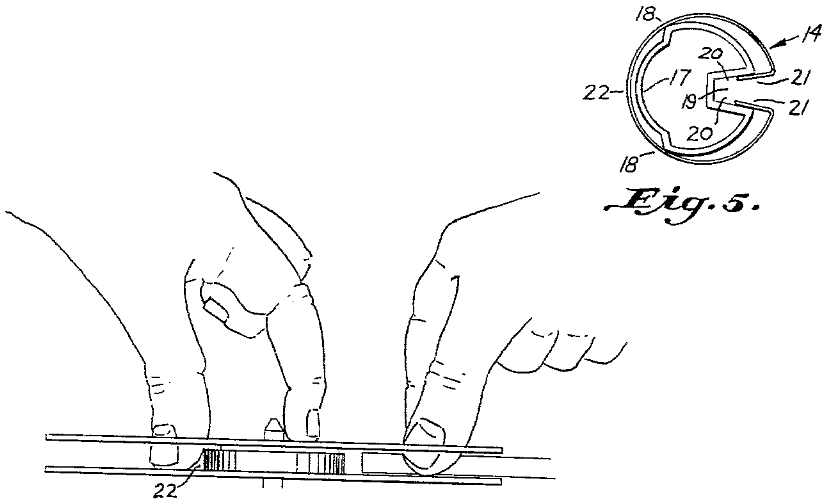
FIGURE 5 is a plan view of the clamp associated with the hub, the clamp being compressed to open the clamping faces.
FIGURE 6 is a side view of the reel with the top flange and showing the left hand compressing the clamp and the right hand inserting a tape end.

The hub 13 spaces the flanges 12 from one another and its general outline is that of a cylinder mounted concentric with center hole 16 of the flanges. It has a recess 17 which is relatively shallow and which provides a deformation space between the hub and the concentrically surrounding clamp 14 so that the deformation area 22 of the clamp can be deformed radially inward into this deformation space. The edges of the recess 17 are two pivot points 18 about which the clamp 14 is pivoted when the deformation area 22 is moved radially inward. This pivoting causes the clamping faces 21 of the clamp to separate to a non-clamping position. The recess extends through an arc of less than 180 degrees of the hub's periphery. Opposite from the recess 17 is a slot 19 arranged in a radial direction and of a width to permit the clamping faces 21 to move to an unclamped position, such as shown in FIGURE 5, where the clamping faces 21 are stopped in their movement by the two slot edges 20.

The clamp 14 is a thin cylindrical band of resilient material of a width slightly less than the spacing between the flanges 12 and of a diameter slightly greater than the diameter of the hub 13. It may be formed from spring steel, plastic, or tempered aluminum. It extends through 360 degrees and has two clamping faces 21 lying in abutting relationship with sufficient clamping force to hold a tape therebetween. The two clamping faces 21 have their area extending radially inward from the outer circumference of the clamp so that the cylindrical outer surface presents an unbroken cylinder as the tape is wound thereabout. The clamping faces 21 are received in the slot 19 of the hub and serve to limit the degree of rotation of the clamp with reference to the hub. The clamping faces may be serrated or otherwise have their tape holding characteristics modified. Preferably, the spring pressure of the clamp and the frictional relationship between the clamping faces and the tape are such that the tape can be freely withdrawn in a radial direction from the clamp without damage thereto, but is of sufficient holding force so that the tape will be retained in the clamp to permit the tape to be wound thereabout without becoming unintentionally disengaged.

Figure 7:
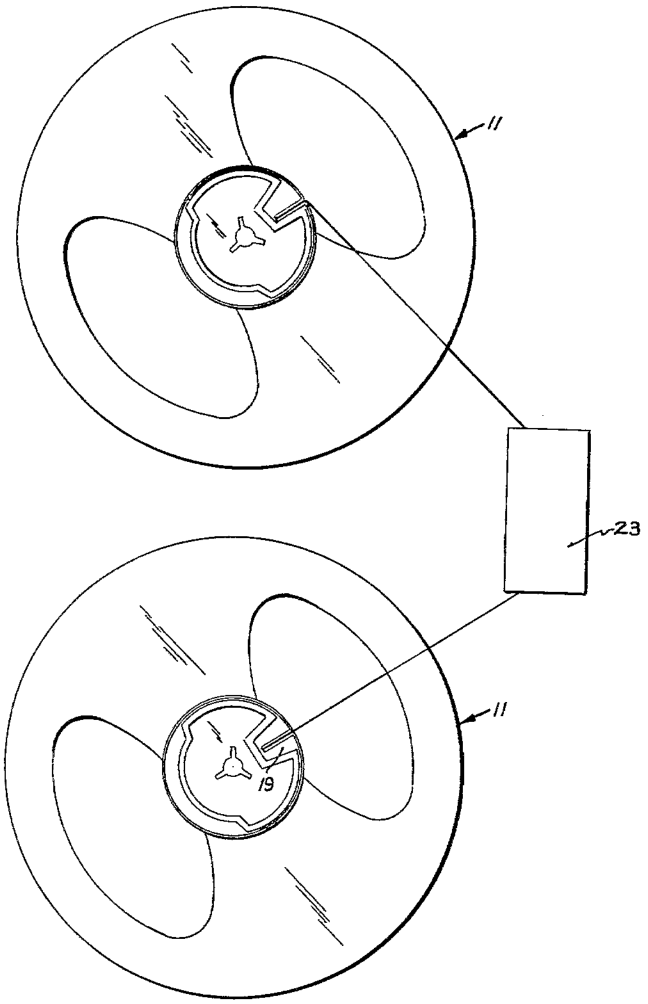
FIGURE 7 is a schematic view showing a typical mounting arrangement for two reels in a tape recorder.

In FIGURE 7 is shown one application of the invention to a tape recorder where two reels 11 are mounted in arrangement where the tape passes over a recording or reading head 23. For purposes of illustration, the tape is made short rather than would be the actual case where a long tape was used and at least one of the reels would have a large number of turns thereupon. A reel containing a full load of tape would be placed on one spindle of the recorder. A portion of the tape would be unwound and passed over the recorder head 23 and inserted in between the clamping faces 21 of the empty reel by first inserting the thumb into open space 16 and contacting the deformation area 22 of the clamp 14. The clamp is then deformed radially inward by applying pressure between the thumb and the index finger which is held against the spindle as shown in FIGURE 6. The inward resilient deformation of the clamp 14 would first cause a pivoting of the clamp about pivot points 18 as shown in FIGURE 5 which would cause an unclamping movement of the clamping faces 21 so that the tape could be inserted therebetween. The tape is held in that position while the deformation force exerted by the thumb is removed permitting the clamp to return to its normal position, such as shown in FIGURE 1, clamping the tape between the two clamping faces 21. The deformation of the clamp 14 is arrested by deformation area 22 contacting the bottom of recess 17 or the clamping faces 21 coming into contact with the slot edges 20. When the tape recorder is turned on, the empty reel will start to rotate and wrap turns of the tape thereupon as shown in the top reel 11 of FIGURE 7. As the end of the tape is reached, as shown in the bottom reel of FIGURE 7, the tape will be pulled radially from between the clamping faces without any damage thereto. The width of the slot 19 is such that the clamp 14 can rotate to a limited degree relative to the hub 13, thus permitting the clamp to follow the tape as it is pulled therefrom permitting a true radial withdrawal even though the now-empty reel is still rotating.

While it is preferred that the clamp 19 be formed with two clamping faces 21 which are loosely assembled about hub 13 it is recognized that the invention can also be practiced with one end of the clamp 19 being affixed to the hub 13 so that the hub itself can provide one clamping face and the clamp the other clamping face. Also, while preferably the clamp is a thin band only slightly less than the width of the space separating the flanges, it is recognized that it may be of substantially less width.

What is claimed is:

1. A reel comprising, in combination, two flanges separated by a hub, a slot in said hub, a recess in said hub on the opposite side of the hub from said slot, a circular resilient spring clamp concentric with said hub of less width than the distance between said flanges, two clamping faces on said clamp meeting one another with the clamping faces extending into said slot to hold the end of a tape in said slot, and a deformation area on said clamp adjacent said recess whereby the clamp may be deformed radially inward into said recess to cause the clamping faces to move to a non-clamping position.

2. A reel comprising, in combination, two flanges separated by a hub, an inward radial slot in said hub of substantial width and a depth less than one-half the diameter of the hub, a shallow recess in said hub on the opposite side of the hub from said slot which extends through an arc of less than 180 degrees of the hub's periphery, a pivot point at each edge of said recess, a circular resilient spring clamp concentric with said hub of slightly less width than the distance between said flanges and a slightly larger diameter than said hub, two clamping faces on said clamp meeting one another with the clamping faces extending radially into said slot to hold the end of a tape in said slot, and a deformation area on said clamp adjacent said recess which may be pressed radially inward whereby the clamp may be resiliently deformed radially inward into said recess to cause the clamp to pivot about said pivot points and cause the clamping faces to move to a nonclamping position to permit the insertion of a tape therebetween and to be clamped thereby upon release of the deformation pressure with sufficient holding force to prevent the tape from becoming unintentionally disengaged but yet readily intentionally withdrawn without damage.

References Cited by the Examiner

FOREIGN PATENTS 137,904 1/1920 Great Britain.
872,454 7/1961 Great Britain.

MERVIN STEIN, *Primary Examiner.*

STANLEY N. GILREATH, *Examiner.*